United States Patent
Abbott

(10) Patent No.: US 8,117,097 B2
(45) Date of Patent: Feb. 14, 2012

(54) METHOD AND SYSTEM FOR IDENTIFYING FRAUDULENT ACCOUNT ACTIVITY

(75) Inventor: Aaron A. Abbott, Naples, FL (US)

(73) Assignee: Citizens Financial Group, Inc., Providence, RI (US)

( * ) Notice: Subject to any disclaimer, the term of this patent is extended or adjusted under 35 U.S.C. 154(b) by 0 days.

(21) Appl. No.: 12/633,833

(22) Filed: Dec. 9, 2009

(65) Prior Publication Data

US 2010/0145834 A1 Jun. 10, 2010

Related U.S. Application Data

(60) Provisional application No. 61/121,214, filed on Dec. 10, 2008.

(51) Int. Cl.
*G07B 17/00* (2006.01)

(52) U.S. Cl. .............. 705/30; 705/44; 705/318; 705/40

(58) Field of Classification Search .............. 705/30, 705/44, 318, 40
See application file for complete search history.

(56) References Cited

U.S. PATENT DOCUMENTS

| | | | | |
|---|---|---|---|---|
| 6,999,943 B1* | 2/2006 | Johnson et al. | ............... | 705/39 |
| 7,272,728 B2* | 9/2007 | Pierson et al. | ............... | 713/194 |
| 7,668,776 B1* | 2/2010 | Ahles | ............... | 705/38 |
| 7,844,546 B2* | 11/2010 | Fleishman et al. | ............... | 705/39 |
| 2006/0015450 A1* | 1/2006 | Guck et al. | ............... | 705/39 |
| 2007/0043648 A1* | 2/2007 | Chait | ............... | 705/37 |
| 2007/0118449 A1* | 5/2007 | De La Motte | ............... | 705/35 |
| 2009/0164351 A1* | 6/2009 | Sorbe et al. | ............... | 705/30 |

* cited by examiner

*Primary Examiner* — Vanel Frenel
(74) *Attorney, Agent, or Firm* — DLA Piper LLP (US)

(57) ABSTRACT

A method and system is provided that evaluates several pieces of information associated with bank accounts at the time they are opened in order to assess the level of fraud risk that the new account creates for the bank. When a new customer establishes an account the various information collected during the account establishment process is analyzed using a logic algorithm that makes a risk assessment. The logic algorithm assigns a risk level wherein the highest risk accounts may be refused immediately while the next highest risk tier is flagged for further monitoring. Once flagged for monitoring, the account is subject to increased scrutiny based on various customer attributes to identify any problematic patterns. If all transactions are normal, the scrutiny flag lapses. If risky transactions continue, a hold is placed on the account and additional investigation is undertaken to either clear or close the account.

18 Claims, 2 Drawing Sheets

METHOD AND SYSTEM FOR IDENTIFYING FRAUDULENT ACCOUNT ACTIVITY

CROSS-REFERENCE TO RELATED APPLICATIONS

This application is related to and claims priority from earlier filed U.S. Provisional Patent Application No. 61/121,214, filed Dec. 10, 2008.

BACKGROUND OF THE INVENTION

The present invention relates generally to a method and system for identifying bank accounts that exhibit high risk behaviors, which generally indicate fraudulent activity. More specifically, the present invention is directed to a method and system that examines various pieces of information relating to the initial opening of a new customer banking account in a systematic manner to determine those accounts that represent the highest risk of fraudulent activity.

In modern banking today there is a large amount of technology in place that allows customers to access their banking accounts from virtually any location in the world at any time of the day. This remote accessibility over great distances is a great asset that allows bank account customers to facilitate bulk transfers of money in a quick and easy manner. However, this same technology makes such bank account technology susceptible to fraudulent use. With the advancement of computer technology and the connectivity afforded by the Internet, it is increasingly easy for criminals, either independently or in organized gangs, to manipulate bank accounts in order to commit fraud against the bank or to deceive innocent victims. In today's banking environment, bank account fraud is on the increase and can be considered one of the largest challenges facing businesses and financial institutions today. As a result of such bank fraud, businesses and banks experience considerable losses of money and time each year due to the prevalence of individuals perpetrating account fraud schemes. Annual economic losses due to account fraud are in the billions of dollars and continue to grow steadily as criminals profit from defrauding victims. For the consumer, the amount of inconvenience and anxiety caused by resolving problems with the account, local merchants, as well as possible repercussions with credit bureaus can be considerable and burdensome.

To combat the problem, some banks have instituted fraud protection services that monitor certain account activity over time to identify various activities that may indicate fraud. The difficulty in the prior art is that most banking accounts are established on equal footing since banks are not willing to initially refuse a new customer who walks through the door. In other words, from the outset all accounts are allowed the full range of transactional freedom making it easier for criminals to perpetrate fraud within newly opened accounts. It is not until the account is established and a pattern of risky behavior has developed to a point that flags the account as a problem that the account is put on hold until the risky activity can be evaluated for the potential of fraud. In these cases, it is often too late as the fraud has already occurred resulting in a write-off cost to the institution establishing the account.

Accordingly, there is a need for a method and system of evaluating the potential fraud risk level for any given bank account at the time that it is opened so that that account will undergo increased scrutiny and monitoring for potential fraud for a period of time after it has been opened. Further, there is a need for a method and system of monitoring bank accounts in a manner that identifies and flags certain risky behaviors early enough to prevent account fraud, thereby decreasing the potential loss exposure of the bank.

BRIEF SUMMARY OF THE INVENTION

In this regard, the present invention provides a method and system that serves to evaluate several pieces of information associated with all new bank accounts at the time they are opened in order to assess the level of fraud risk that the new account creates for the bank. In contrast to the prior art, when a new customer establishes an account the method and system of the present invention provides for the various information collected during the account establishment process to be analyzed using a logic algorithm that makes a risk assessment immediately. Upon performing the risk assessment, the logic assigns a risk level wherein the highest risk accounts may be refused immediately while the next highest risk tier is flagged for further monitoring. In other words, the method and system of the present invention takes industry level data that is normally provided to the bank as part of the account establishment and verification processes and adds a logic based assessment of that data to provide a layer of interpretation that assigns and detects risk before any banking account activity takes place within the account.

Once flagged for monitoring, the account is subject to increased scrutiny based on various customer attributes such as the type of identification that is presented during the account opening, payment history, address issues or any other criteria identified as risky to the bank. In this manner, each of the transactions that occur in that account is monitored to identify any problematic patterns. For example, the various information collected during the initial assessment is married with posting transactions like deposits to determine if there may be a case of fraud going on. Basically, if the opening characteristics identify a potentially risky person, when the transaction is posted a more detailed review process of the transaction and person is employed. If the transaction is identified as fraud a hold is placed on the account and the account is sent for closure. Risky transactions that would flag an account could be, for example, a deposit consisting of checks from closed accounts, counterfeit checks, or altered checks.

In operation, the method and system of the present invention provides for a customer to establish a new account. Upon establishment logical rules are applied based on the size the initial deposit, the manner in which the initial deposit is made and a profile of the available history or lack thereof for the person opening the account. Based on this information, a risk assessment score is assigned and the account is either set to normal of flagged as a potentially suspect account for further scrutiny. As further activity occurs in the account over the next 30 to 90 days the activity is monitored to determine whether or not additional risky transactions are occurring or whether the account activity is normal. If all transactions are normal the scrutiny flag lapses and the account status becomes normal. If however risky transactions continue, a hold is placed on the account and additional investigation is undertaken to either clear or close the account.

It is therefore an object of the present invention to provide a method and system of evaluating the potential fraud risk level for any given bank account at the time it is opened so that that account will undergo increased scrutiny for a period of time after it has been opened. It is a further object of the present invention to provide a method and system of monitoring bank accounts in a manner that identifies and flags certain risky behaviors early enough to prevent account fraud thereby decreasing the potential loss exposure of the bank.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
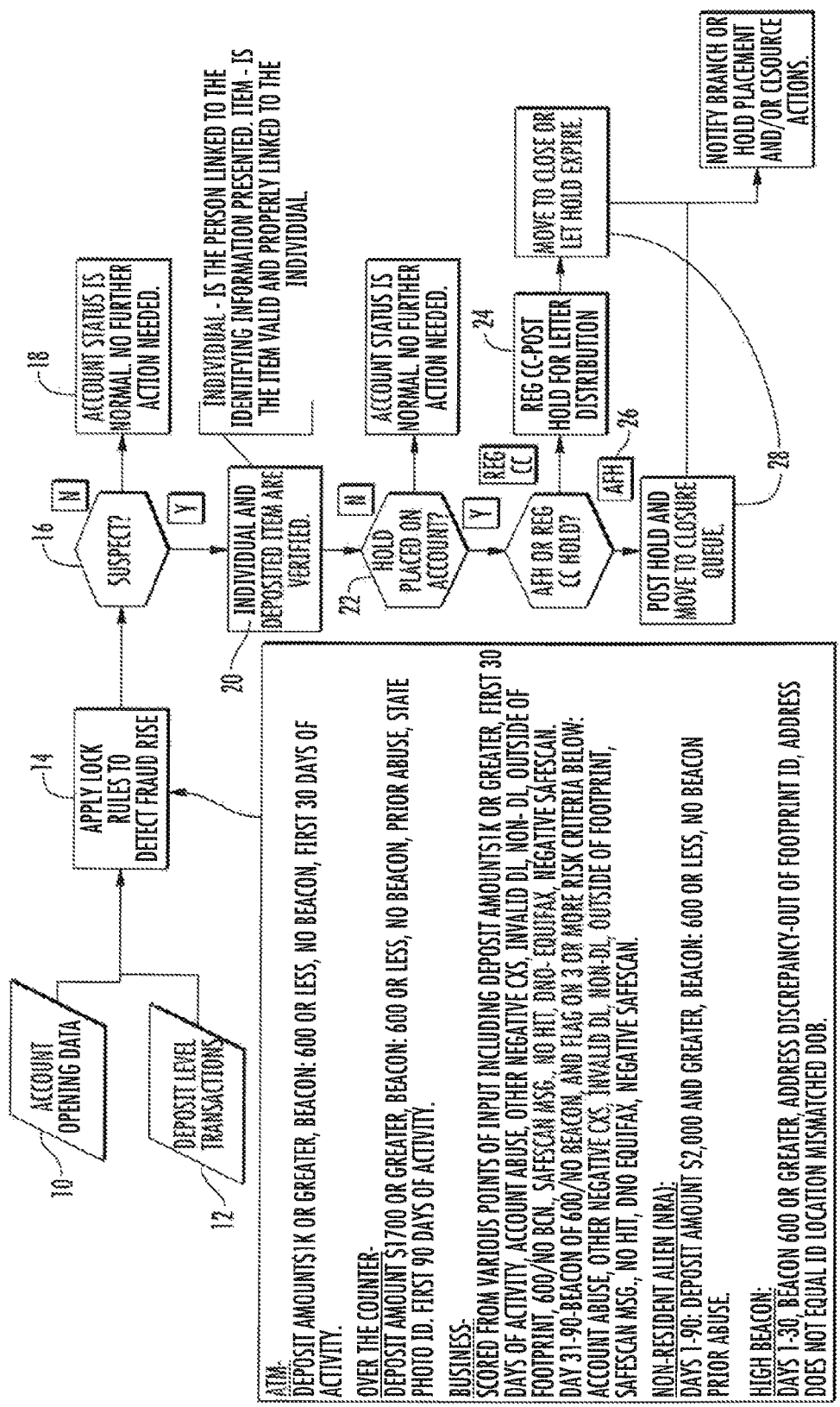
FIG. 1 is a flow chart depicting the method of the present invention.

Now referring to the drawings, the method and system is shown and generally illustrated in the figures. As can be seen, the present invention provides a method and system that serves to evaluate several pieces of information associated with bank accounts by applying a logical analysis rule at the time they are opened in order to assess the level of fraud risk that the new account creates for the bank from the outset. Upon performing the risk assessment, the logic assigns a risk level wherein the highest risk accounts may be refused immediately while the next highest risk tier is flagged for further monitoring. In other words, in the most general embodiment, the method and system of the present invention takes industry level data that is normally provided to the bank as part of the account establishment and verification processes and adds a logic based assessment of that data to provide a layer of interpretation that assigns and detects risk immediately at the time the account is opened.

Turning now to FIG. 1, the method can be seen as illustrated in the form of a flow chart. Initially, a bank customer approaches a bank service provider to establish a new account. The bank customer provides the bank with several pieces of data that are used in creating the account record 10. Such data collected may include the customer's address, the form of identification provided, the customer's credit history, credit rating and other industry standard data provided through Equifax and ChexSystems check verification service. Further, the amount and manner in which the initial deposit is made is tracked 12.

Once the initial account opening data is collected, a logical rule based algorithm 14 is applied to the data as will be described in more detail below. The application analysis based on the account opening data heretofore has not been used in the prior art as instead banks waited to see if a problematic pattern developed over time rather than making such an assessment at the outset of the account creation. Based on the logical assessment of the account opening data a determination is made to assess whether a likelihood of transactional fraud events exists 16. If the assessment does not indicate a risk, then the account status is maintained as normal, and no further action is required 18. However, should the logical assessment 14 indicate that such a likelihood does in fact exist, the account is flagged for further verification and monitoring.

Once an account is flagged for further monitoring, the account is subject to increased scrutiny based on various customer attributes such as the type of identification that is presented during the account opening, payment history, address issues or any other criteria identified as risky to the bank 20. In this manner, each of the transactions that occur in that account is monitored to identify any problematic patterns. For example, the various pieces of information that are collected during the initial assessment are married with posting transactions like deposits to determine if there may be a case of fraud going on. Basically, the opening characteristics identify a potential risky person, when the transaction is posted a more detailed review process of the transaction and person is employed. The person is scrutinized to determine if they are actually linked to the identification information presented. Further the deposit item is reviewed to verify that it is in fact valid and properly linked to the individual completing the transaction. Risky transactions could be, for example, a deposit consisting of checks from closed accounts, counterfeit checks, or altered checks.

If after heightened scrutiny of the individual and/or the deposit item the transaction is identified as highly risky or associated with potential fraud, a hold is placed on the account 22. Such a hold may take the form of a Regulation CC account hold 24 or an All Funds Hold (AFH) 26. With the hold in place the account is sent for closure 28.

Figure 2:
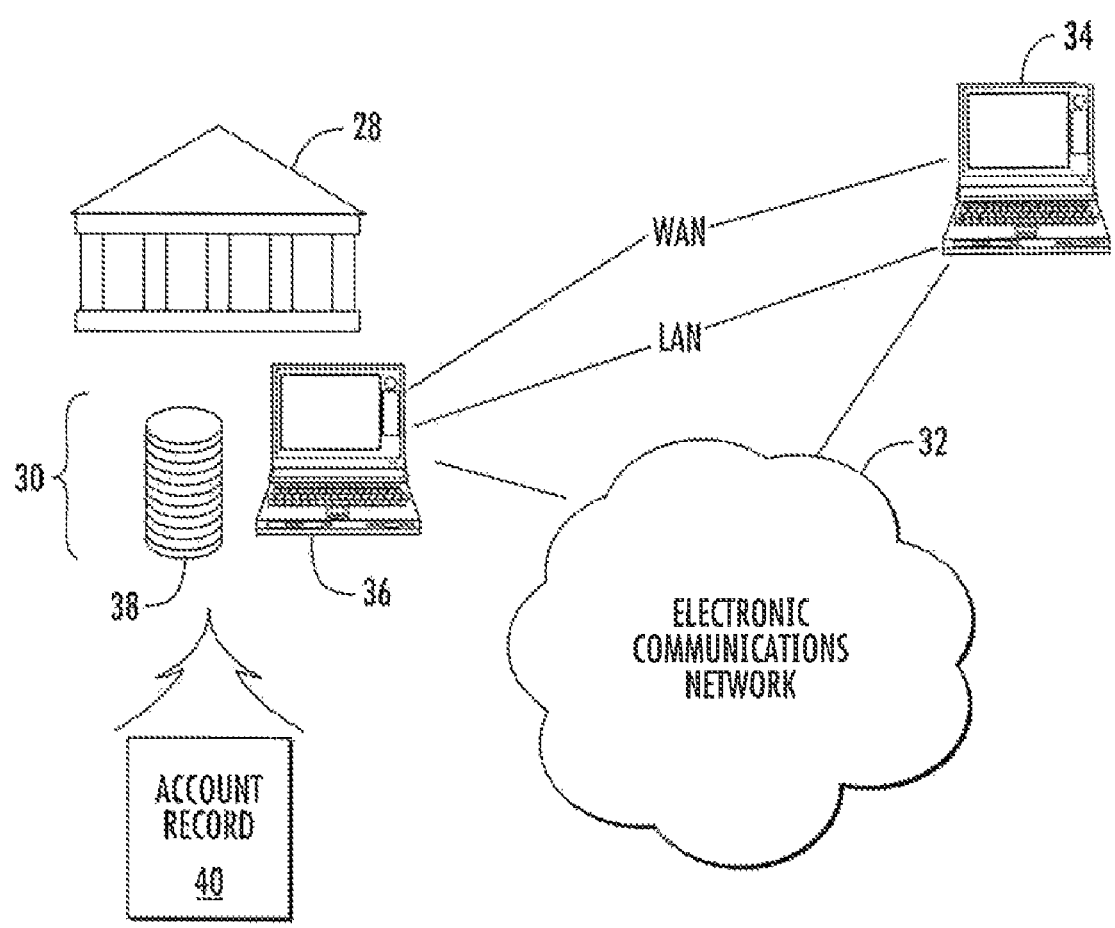
FIG. 2 is a schematic of a system for implementing the method of the present invention.

In operation, the method and system of the present invention operates on a system such as generally illustrated at FIG. 2. The system includes a bank service provider 28 at which a customer seeks to establish a new account. Upon establishment of the account various information is collected from the customer and entered into a computer system 30 maintained by the bank service provider. Such a computer system 30 may be local or remote to the bank service provider location further access to the computer system may be remote via an electronic communications network 32 or direct via a user interface 34 connected with the computer system 30 via wide area network (WAN) or local area network (LAN). The computer system includes at least a processor 36 and a data storage means 38.

As the information collected from the customer is entered into the computer system 30 it is associated with an account record 40 maintained within the data storage means 38. The processor 36 applies logical rules to the information contained within the record 40 based on the size the initial deposit, the manner in which the initial deposit is made, the identification information provided by the customer and a profile of the available history or lack thereof for the person opening the account. Based on the application of the logical rules to this information, the processor assigns a risk assessment score and the account record is either set to normal of flagged as a potentially suspect account for further scrutiny. As further activity occurs in the account over the next 30 to 90 days the activity is monitored to determine whether or not additional risky transactions are occurring or whether the account activity is normal. If all transactions are normal the scrutiny flag lapses and the account status becomes normal. If however risky transactions continue, a hold is placed on the account and additional investigation is undertaken to either clear or close the account.

As was stated above, logical rules are applied to the information within the account record to determine an overall risk level associated with the account record. The application of logical rules is dependent on the type of account. An automatic teller machine accessible account is scrutinized for 30 days based on an initial deposit amount that exceeds $1,000 wherein the customer has a credit beacon of 600 or less or where the customer has no established beacon. Similarly, for an over the counter transactional account the account receives additional scrutiny for a period of 90 days should the initial deposit amount exceed $1,700 wherein the customer has a credit beacon of 600 or less, where the customer has no established beacon, prior account abuse appears in the customer's credit history or the customer presents only a state photo ID card.

When establishing a business account the monitoring period is based on activity in the first 30 days and then in the subsequent 60-day period. During the first 30 days a business account receives additional scrutiny of the initial deposit exceeds $1000, there was prior abuse in the customer's credit history, a negative Equifax, SafeScan or ChexSystem message, invalid or no drivers license or a beacon of less than 600. Within the next 60 days, accounts with a beacon of 600 or less are flagged should the account exhibit any three of the following: account abuse, negative data from ChexSystems, SafeScan or Equifax and invalidity of driver's license.

Non-resident alien accounts are monitored for 90 days should the account information trigger the logical rules wherein a deposit of $2000 or greater is made, the customer's credit beacon is 600 or less or there was prior account abuse. Finally, a customer having a credit beacon of greater than 600 will still be flagged for additional scrutiny of there is an address discrepancy between the ID and the account address or a mismatched date of birth is found.

It therefore can be seen that the present invention provides a method and system of evaluating the potential fraud risk level for any given bank account at the times it is opened so that that account will undergo increased scrutiny for a period of time after it has been opened in order to identify and flag certain risky behaviors early enough to prevent account fraud thereby decreasing the potential loss exposure of the bank. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of assessing and managing risk associated with a transactional banking account, comprising:
    collecting information and an initial deposit from a customer;
    inputting said information and initial deposit using a user interface in electronic communication a computer system having a processor and a data storage means to establish an account record;
    applying an algorithm via said processor to analyze the account record information and initial deposit to assign a risk level from high to low to the customer based on the nature of the information and the initial deposit;
    refusing to establish a transactional bank account for customers assigned the highest risk; establishing a new transactional bank account for customers assigned the lowest risk; establishing a new monitored transactional bank account for customers having assigned risk between the highest and lowest risk levels; and
    monitoring the monitored transactional account via the processor for a period of time after the account is established, wherein the monitoring is terminated at the end of the time period if no further risk factors appear within the account, wherein the account is flagged for closure if further risk factors appear within the account.

2. The method of claim 1, wherein the algorithm assigns risk based on the amount of the initial deposit and the manner in which it was made.

3. The method of claim 1, wherein the algorithm assigns risk based on the type of identification provided by the customer at the time of the account opening.

4. The method of claim 1, wherein the algorithm assigns risk based on mismatches between the mailing address for the account and the address on the identification provided by the customer at the time of account opening.

5. The method of claim 1, wherein the algorithm assigns risk based on the residential status of the customer.

6. The method of claim 1, wherein the algorithm assigns risk based on the credit beacon of the customer.

7. The method of claim 1, wherein the algorithm assigns risk based on industry level data available from monitoring services.

8. The method of claim 1, wherein the algorithm assigns risk by analyzing each of the following: the amount of the initial deposit and the manner in which it was made, the type of identification provided by the customer at the time of the account opening, mismatches between the mailing address for the account and the address on the identification provided by the customer at the time of account opening, the residential status of the customer, the credit beacon of the customer and industry level data available from monitoring services.

9. A method of assessing and managing risk associated with a transactional banking account, comprising:
    collecting information and an initial deposit from a customer;
    inputting said information and initial deposit using a user interface in electronic communication a computer system having a processor and a data storage means to establish an account record; applying an algorithm via said processor to analyze the account record information and initial deposit to assign a risk level to the customer based on the nature of the information and the initial deposit;
    establishing a new monitored transactional bank account for customers having higher risk levels; and monitoring the monitored transactional account via the processor for a period of time after the account is established, wherein the monitoring is terminated at the end of the time period if no further risk factors appear within the account, wherein the account is flagged for closure if further risk factors appear within the account.

10. The method of claim 9, wherein the algorithm assigns risk based on the amount of the initial deposit and the manner in which it was made.

11. The method of claim 9, wherein the algorithm assigns risk based on the type of identification provided by the customer at the time of the account opening.

12. The method of claim 9, wherein the algorithm assigns risk based on mismatches between the mailing address for the account and the address on the identification provided by the customer at the time of account opening.

13. The method of claim 9, wherein the algorithm assigns risk based on the residential status of the customer.

14. The method of claim 9, wherein the algorithm assigns risk based on the credit beacon of the customer.

15. The method of claim 9, wherein the algorithm assigns risk based on industry level data available from monitoring services.

16. The method of claim 9, wherein the algorithm assigns risk by analyzing each of the following: the amount of the initial deposit and the manner in which it was made, the type of identification provided by the customer at the time of the account opening, mismatches between the mailing address for the account and the address on the identification provided by the customer at the time of account opening, the residential status of the customer, the credit beacon of the customer and industry level data available from monitoring services.

17. A system of assessing and managing risk associated with a transactional banking account, comprising:

a computer system at a bank service provider having a processor and a data storage means; a user interface in electronic communication with said computer system for inputting information and an initial deposit collected a customer for the establishment of an account record; and an algorithm that operates on said processor that analyzes the information and initial deposit to assign a risk level to the customer based on the nature of the information and the initial deposit; wherein said bank service provider establishes a new monitored transactional bank account for customers having higher risk levels, wherein the account record is monitored for a period of time after the account is established, wherein the monitoring is terminated at the end of the time period if no further risk factors appear within the account, wherein the account is flagged for closure if further risk factors appear within the account.

18. The system of claim 17, wherein the algorithm assigns risk by analyzing each of the following: the amount of the initial deposit and the manner in which it was made, the type of identification provided by the customer at the time of the account opening, mismatches between the mailing address for the account and the address on the identification provided by the customer at the time of account opening, the residential status of the customer, the credit beacon of the customer and industry level data available from monitoring services.

* * * * *